Jan. 31, 1956 H. OSTERBERG 2,732,759
MICROSCOPE WITH VARIABLE MEANS FOR GRADUALLY
ALTERING THE CONTRAST IN OPTICAL IMAGES
Filed July 26, 1949 2 Sheets-Sheet 1

INVENTOR
HAROLD OSTERBERG
BY Louis L. Gagnon
Noble S. Williams
ATTORNEYS

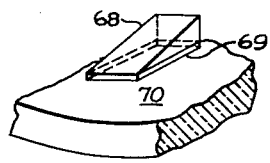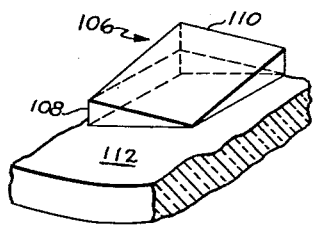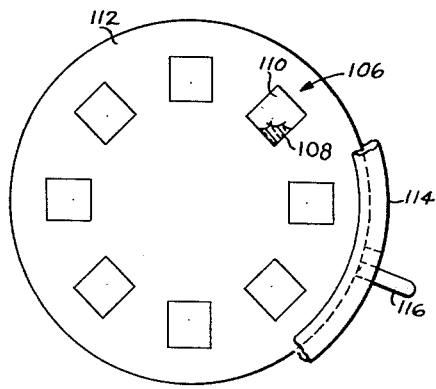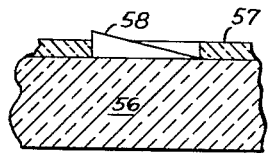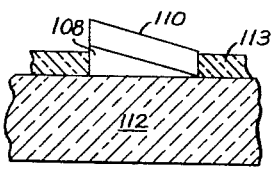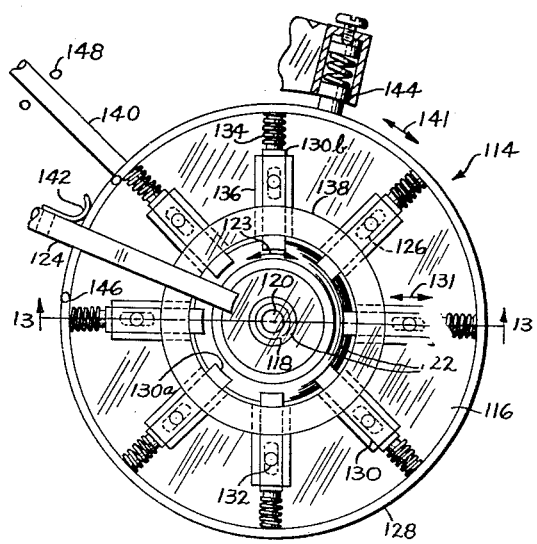

United States Patent Office 2,732,759
Patented Jan. 31, 1956

2,732,759

MICROSCOPE WITH VARIABLE MEANS FOR GRADUALLY ALTERING THE CONTRAST IN OPTICAL IMAGES

Harold Osterberg, Buffalo, N. Y., assignor to American Optical Company, Southbridge, Mass., a voluntary association of Massachusetts Application July 26, 1949, Serial No. 106,898

9 Claims. (Cl. 88—39)

This invention relates to optical systems and devices for obtaining gradual modification of contrast effects in images of objects. More particularly, the invention relates to such systems and devices when incorporated with a microscope for viewing structural differences in specimens which are not clearly perceptible through usual methods of microscopy.

An object or specimen of a type considered herein may be regarded as constituting a plurality of particles and surrounding regions, a given particle and the adjacent surround having, for example, a small difference of optical path (thickness times refractive index) or a small transmission difference, or both. For clarity of explanation, a single particle and its surround and the relation and control of light rays directed upon and emanating therefrom will be considered.

Known methods of so-called "phase microscopy" involve optical path and/or transmission differences in different regions of a specimen and the introduction of retardation and/or absorption components in the optical system according to said differences in the specimen. These methods customarily employ a diaphragm adjacent the entrance pupil of an optical system for admitting a bundle of light rays of a given transverse contour to a condenser. The latter directs the light upon an object or specimen and an objective and eyepiece are employed in a conventional manner. At the back focal plane or exit pupil of the optical system formed by the condenser and objective, a special light-modifying element is positioned for altering phase and/or amplitude differences which exist between deviated (diffracted) and undeviated light rays emanating from the specimen. Some of the light rays incident the particle are deviated thereby as, for example, due to discontinuity of optical path at the edge of the particle and may be considered as altered in phase and consisting of higher orders of spectra. Other light rays incident the particle emerge therefrom as undeviated rays and constitute the zero order. Light rays passing through the surround may be considered as substantially undeviated rays also for purposes of illustration. The undeviated rays emerging from the particle and surround are spread throughout a visible image plane such as the field of an eyepiece. The deviated rays or spectra are brought to a focus on a part of the eyepiece field and are combined with overlapping portions of the undeviated rays to form a geometrical image of the particle. During their transmittal by the aforesaid light-modifying element, the deviated and undeviated rays, which have a difference in phase and/or amplitude as substantially determined by the specimen, are selectively intercepted and altered in phase and/or amplitude so that either reinforcing or destructive interference takes place therebetween to provide either bright or dark contrast of the particle with respect to the surround.

The present invention is related to the above-described method but employs novel means for directing the light rays upon an object or specimen and, more particularly, for modifying phase and amplitude differences between the deviated and undeviated rays emanating therefrom so that uninterrupted progressively variable changes of contrast in an image may readily be obtained, rather than abrupt stepwise alteration of contrast effects. Accordingly, the particle and surround may be represented throughout a wide and continuous range of contrast effects simply by rotating or otherwise moving an adjustable element of the system.

Although a diaphragm is shown and described herein as a preferred means for admitting light to the system and for controlling the dimensions and contour of light, other means may be employed for a similar purpose. The term "light," as used herein, is not necessarily restricted to those wave lengths of radiant energy to which the human eye is sensitive but may comprise other forms of radiant energy, including those in the invisible portions of the spectrum. Accordingly, any suitable primary or secondary light source may be utilized in the optical systems of the invention. A diaphragm, having a plurality of apertures of predetermined dimensions and contour, as employed herein, provides a secondary light source and is thus considered as falling within the meaning of the term light source. Other light sources which could be positioned similarly to the diaphragm in the system and which are contemplated by the invention comprise an incandescent filament, a fluorescent tube, a reflecting surface, the image of a lamp filament or of an aperture, or the image of some other source of radiant energy.

An object of the invention is to provide an adjustable optical system or device for the examination of an object which is capable of gradually altering, in an uninterrupted progressively variable manner, contrast effects in an image of the object so that its structure may be more clearly apparent.

Another object of the invention is to provide such a system or device which is particularly adapted to a microscope.

A further object of the invention is to provide an adjustable system or device which permits a gradual alteration, in an uninterrupted progressively variable manner, of both phase and amplitude relations between deviated and undeviated light rays emanating from an object, and which enables said alteration of phase and amplitude, either together or independently of one another.

Still another object of the invention is to provide suitable coacting optical elements and a compact optical system of simple construction for obtaining the aforesaid results.

These and other objects of the invention will be apparent from the following description taken in connection with the accompanying drawings, wherein like reference characters refer to like parts throughout the several views of which:

Figs. 6 and 7 are fragmentary perspective views of other elements of the invention;

Fig. 8 is a front detail view of another element for use in an optical system of the invention;

Figs. 9, 10 and 11 are fragmentary side elevation views, partly in cross-section, of other components of the invention;

Fig. 12 is a front detail view of a diaphragm element of the invention; and

Figure 1:
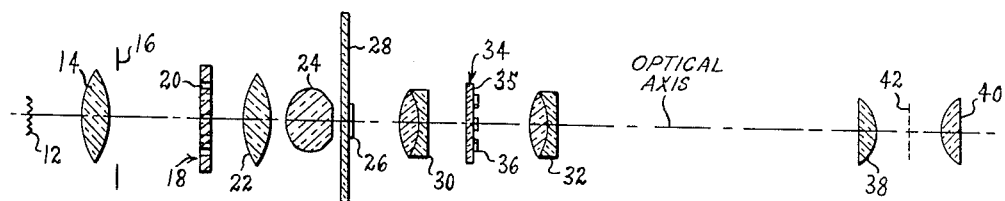
Figure 1 is a diagrammatic view of an optical system forming one embodiment of the invention.

The optical system shown in Fig. 1 may suitably be employed in a microscope. Light from a source such as filament 12 is directed by lens 14 and field stop 16 upon a special diaphragm 18 which serves as a secondary light source. Diaphragm 18 of Fig. 1 is merely a diagrammatic representation and is intended to illustrate any of the diaphragms presently to be described herein. Diaphragm 18 is preferably circular and comprises one or more light apertures 20. In a preferred embodiment, a plurality of apertures are employed, said apertures preferably being of similar dimensions, equally spaced, and radially equidistant from the center of the diaphragm. Condenser elements 22 and 24 direct the light rays from apertures 20 upon an object or specimen 26 mounted upon a slide 28. An objective comprising elements 30 and 32 is employed and a special light-modifying means 34 is positioned at the back focal plane or exit pupil of the system formed by the combined condenser and objective. Light-modifying means 34, as shown in Fig. 1 consists of a transparent plate-like element 35 having one or more light-altering wedge-like portions 36 formed thereon. In a preferred embodiment, a plurality of wedges are employed, said wedges preferably being of similar characteristics and positioned radially equidistant from the center of plate 35. However, any of the light-modifying elements to be described herein could be substituted for that shown in Fig. 1, provided a suitable diaphragm or the equivalent is matched therewith. An eyepiece comprising elements 38 and 40 and having an image plane 42 completes the optical system of Fig. 1.

Light-modifying means 34, coacting with other components of the system is of a type for selectively and gradually altering a wave characteristic or characteristics, namely the phase and/or amplitude, of light rays emanating from a specimen. As above described, diffraction of light and phase and amplitude differences are produced by structural differences within the speciment. It has further been pointed out that alteration of the phase and amplitude differences thus existing between deviated and undeviated light rays emanating from the specimen may be performed to provide reinforcing or destructive interference of the deviated and undeviated waves or rays as they overlap in the image plane of the objective so that a particle is represented, respectively, in bright or dark contrast relative to the surround according to the characteristics of the light-modifying means.

Light from each aperture 20 of diaphragm 18 is focused upon a relatively small area of each wedge 36 of light-modifying means 34, at any given time, said area constituting the image or conjugate area. Inasmuch as different portions of the wedge are thus employed, the wedges per se may be termed the conjugate area or zone. All of the light (zero order spectra) which is undeviated by the object or specimen passes through the wedges 36. The deviated light (higher order spectra) predominantly passes through the remaining portions 35 of element 34, said portions 35 being termed the complementary area or zone. The conjugate zone is that which is employed for gradually varying phase and amplitude of the light rays. Amplitude modifying wedges may appropriately be formed by evaporating a metallic substance such as aluminum or Inconel in wedge-like form as, for example, upon plate 35 or upon a coating applied thereto. Phase-modifying wedges may suitably be formed by evaporating a dielectric substance such as magnesium fluoride or quartz in wedge-like form as, for example, upon plate 35, upon a coating applied thereto, or upon the metallic wedge. All of the wedges shown herein are greatly exaggerated as to size and thickness for purposes of illustration. Conversely, the metallic wedge may be formed upon the dielectric wedge. Assuming the simultaneous focusing of a small bundle of light rays upon like portions of each wedge it will be apparent that simultaneous movement of each bundle in a like direction relative to its respective wedge will produce a similar gradual modification of the characteristics of said bundles and, accordingly, different contrast effects may be provided in an image as hereinbefore described. Various means for causing the undeviated light rays to traverse the wedges, as well as various types of wedges, are comprised by the invention and will be described herein.

Figure 2:
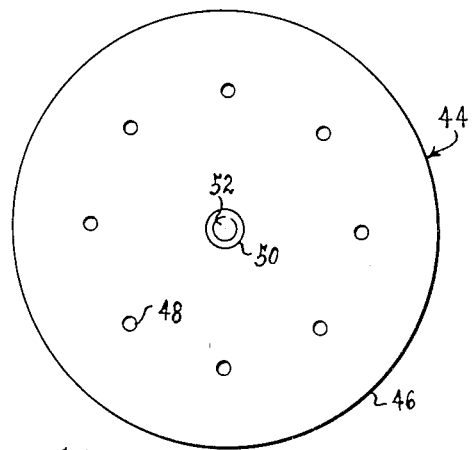
Figs. 2 and 3 are front detail views of elements suitable for use in an optical system of the invention.
Figure 3:
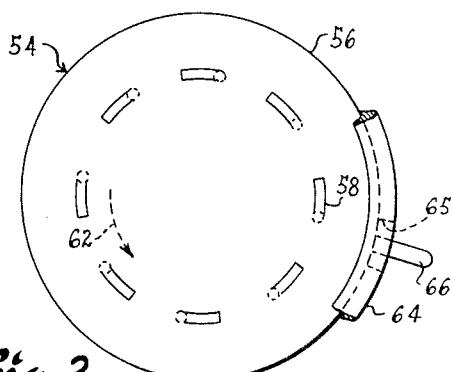

Figure 2 illustrates a simple form of diaphragm 44 comprising an opaque disk 46 having a plurality of apertures 48 similarly radially formed therein and a hub 50 permitting the diaphragm to be rotated about a shaft 52. Fig. 3 represents a light-modifying element 54 of a type adapted to coact with diaphragm 44 comprising a transparent plate or disk 56 having a plurality of wedge-like components 58 formed thereon, said components being either of a phase-modifying type or an amplitude-modifying type, above described. Assuming diaphragm 44 to be rotatable, element 54 may be fixed. When diaphragm 44 is rotated, the images 60 of the diaphragm apertures are caused to move circularly and to traverse wedges 58 in the direction of arrow 62. It will be apparent that diaphragm 44 could be fixedly mounted and element 54 could be rotatable, as, for example, the latter could be mounted in a grooved ring 64 and rotated by means of a lever 66 to achieve a similar result. Diaphragm 44 and plate 54 could thus be employed as the components represented by elements 18 and 34 of Fig. 1 to provide a system capable of gradually modifying either phase or amplitude differences of the light rays depending upon whether the wedge components 58 were formed of a dielectric or a metallic substance.

Figure 4:
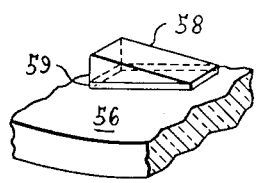
Fig. 4 is a fragmentary perspective view of a component of the invention.

Fig. 4 represents a wedge 58 carried by a plate or disk 56 of the general type shown in Fig. 3. A layer 59 of absorbing or retarding material of constant thickness, namely, absorbing if the wedge is retarding and vice versa, is preferably superposed with the wedge for improving the contrast effects. It is to be understood that wedge components may be of various shapes provided all of the wedges carried by a given element are identical and provided their taper is continuous and even. Where rotational movement of the images is involved, it will be apparent that the wedges may advantageously be in the form of sectors.

Figure 5:
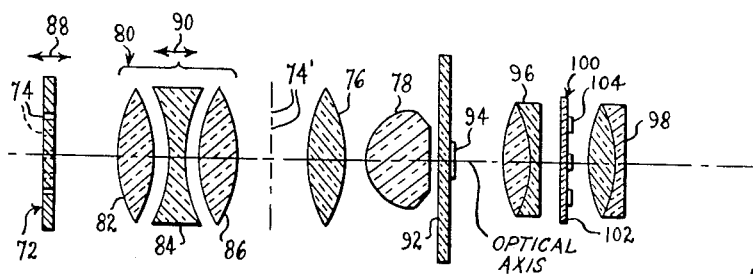
Fig. 5 is a diagrammatic view of another optical system of the invention.

Fig. 5 illustrates an optical system wherein the images of a plurality of apertures formed in a diaphragm may be moved radially with respect to a plurality of radially tapered wedge-like components carried by a transparent plate element. A wedge-like component 68 of the type above-described for modifying either phase or amplitude of the undeviated light rays is shown in Fig. 6, said wedge and a layer 69 similar to layer 59 of Fig. 4 being formed upon the conjugate zone of a transparent plate 70. The system of Fig. 5 comprises an adjustable diaphragm 72 having a plurality of apertures 74 formed therein. The radial positions of the images of the apertures 74 can be varied optically by providing variable magnification of the images 74' of said apertures formed at plane 72', near the first focal plane of a condenser comprising components 76 and 78. A narrow range of magnification is all that is required for the purpose. Said variable magnification may be achieved through the provision of an adjustable lens system 80 comprising a plurality of components 82, 84 and 86 and by varying the spacing along the optical axis between diaphragm 72 and lens system 80 and between lens system 80 and image plane 72'. The movable feature of diaphragm 72 and lens system 80 is indicated by double-headed arrows 88 and 90, suitable means for the purpose (not shown) as, for example, an interlocking means for simultaneously performing both movements, being included. Movements of diaphragm 72 and lens system 80 should be so controlled as to insure that the images 74' remain focused at the plane 72′ and, ideally, the microscope illuminator (not shown) should be included in the above-suggested interlocking means so that the lamp filament, for example, remains focused at the plane of the diaphragm.

Other elements of Fig. 5 comprise a slide 92 carrying a specimen 94, objective lens components 96 and 98, and a light-modifying means 100 formed of a transparent plate 102 having a plurality of wedge-like components 104 formed thereon. An eyepiece may appropriately be included, although not shown. The images 74′ are imaged upon wedge-like components 104. By performing the above-described adjustment of components 72 and 80 and thus varying the magnification of the images 74′, gradual variation of the radial position of the images of images 74′ is obtained so that they are caused to move radially along the wedges 104 and correspondingly to pass through varying thicknesses thereof, thus providing contrast in the visible image, as above described.

By combining certain features of the components and systems hereinbefore described, it becomes possible to gradually vary both phase and amplitude of the undeviated light rays separately and independently. Fig. 7 illustrates a light-modifying element comprising a composite wedge-like component 106. Said component is formed, for example, of a wedge 108 composed of a dielectric light-retarding substance and a wedge 110 formed of a metallic light-absorbing substance-superposed therewith. Materials of the type previously described or other suitable absorbing and retarding materials may be employed in forming the wedges and they may be reversed as to their relative positions shown in Fig. 7. The wedges which, as before stated, are greatly exaggerated as to size, may be considered as having been deposited by an evaporation or other suitable process upon the conjugate zone or area of a transparent disk 112, portions not occupied by the wedges constituting the complementary area or zone of the disk. It will be noted that wedges 108 and 110 taper in directions at 90° relative to one another. Fig. 8 represents a plurality of such wedge-like components 106 formed upon disk 112, said components occupying the conjugate zone of the disk and other portions of the disk constituting the complementary zone. The disk may be rotatable or fixed according to whether the diaphragm used in the system is, respectively, nonrotatable or rotatable. For rotation of the disk, a mounting ring 114 and actuating lever 116 are provided. Assuming the light-modifying element of Figs. 7 and 8 to be employed in the system of Fig. 5, in the plane of element 100 thereof, and assuming diaphragm 72 of Fig. 5 to be rotatable, it will be apparent that rotation of diaphragm 72 causes the images of apertures 74 to traverse all of the wedges in a similar direction. Accordingly, said images of the apertures are moved circularly or substantially tangentially across different thicknesses of wedges 108 and a gradual modification of phase of the undeviated light rays is performed. When axial adjustment of diaphragm 72 and lens assembly 80 is made to provide radial movement of the images, as above described, said images will be caused to traverse different thicknesses of wedges 110 and a gradual modification of amplitude of the undeviated light rays is thus obtained.

The wedges described herein need not be formed to rise linearly from one end to the other but should rise continuously and smoothly. Where a linearly tapering wedge is employed and the direction of taper is radial, rotational movement of the images would be accompanied by a traversal of slightly different thicknesses of said wedge. This difference of thicknesses may, however, be held within such limits as to permit no significant phase or amplitude changes so that said rotational movement may be considered, for all practical purposes, substantially as tangential movement. Where the wedges are nonlinear, they may be so formed as to have a constant thickness throughout the path of said incidental radial movement. It may thus generally be assumed that rotational movement of the diaphragm or light-modifying disk produces a movement of the images continuously and evenly along wedge 108 and that adjustment of lens and diaphragm means of Fig. 5 produces radial movement of the images continuously and evenly along wedge 110. For obtaining either phase or amplitude modification completely independently, the direction of taper of each wedge of a composite wedge structure should extend at right angles to the other. Where some predetermined degree of modification of both phase and amplitude through either rotational or radial movement of the images is desired the wedges of one wedge component may be relatively disposed at some other angle of orientation with respect to the second wedge.

Figs. 9, 10, and 11 illustrate wedges and disks of the general type above described relative to Figs. 4 and 7 but additonally include coatings or layers 57, 113 and 115. These coatings are of constant thickness and are applied to or deposited upon surface portions of the disk, exclusive of the areas occupied by the wedges, said coatings, accordingly, being functionally identified with the complementary areas or zones. The coatings may be formed of suitable retarding and absorbing materials, such as a dielectric substance or a metallic substance, according to the constant phase or amplitude modification of the deviated light incident the complementary zone which is desired, in conjunction with the variable modification of the undeviated light which is performed by the wedges. In Figs. 9 and 10, either a dielectric or a metallic coating is employed and in Fig. 11 both types of coatings, in superposed relation, are utilized.

Figure 13:
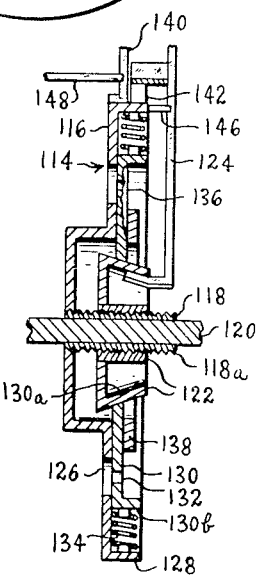
Fig. 13 is a cross-sectional view of the diaphragm of Fig. 12 taken along the line 13—13.

Figs. 12 and 13 illustrate a modified diaphragm 114 which is capable of independently providing both rotational and radial movement of the images which are incident the wedges. Accordingly, diaphragm 114 may be employed in the system of Fig. 1 in conjunction with light-modifying means of the type shown in Figs. 7, 8, 10 and 11. Or, diaphragm 114 may be embodied in the system of Fig. 5 by eliminating elements 72 and 80 and placing the diaphragm at the image plane 72′. Diaphragm 114 comprises a circular plate member 116 having a hub 118 adapted to rotate relative to a shaft 120, the latter being suitably mounted within a housing (not shown), said hub being fixed against longitudinal movement on said shaft in any suitable manner. The outer surface 118a of hub 118 is threaded as shown in Fig. 13. A frusto-conical element 122 is threadedly engaged with said surface 118a. Element 122 may be manually rotated, as indicated by double-headed arrow 123, by an arm 124. Rotation of element 122 produces a forward or rearward movement thereof relative to planar surfaces of plate 116 by reason of said threaded engagements of parts. Plate member 116 includes a plurality of preferably elongated perforations or light apertures 126 having similar radii and spacing therebetween. Plate 116 also includes an outer rim 128. A plurality of plate-like slides 130 are mounted for radial movement longitudinally of light apertures 126, as indicated by double-headed arrow 131. Each slide has a light aperture 132 formed therein. One end 130a of each slide bears against the conical surface of element 122 under bias applied to the other end 130b thereof by a spring 134 interposed between end 130b and rim 128. Guide means 136 are provided for insuring a radial direction of movement of the slides and an annular ring 138, fixedly attached to guide means 136, serves to hold the slides within the guide means while permitting slidable movement thereof. A handle 140 attached to plate 116 permits manual rotation of the entire diaphragm assembly, as indicated by double-headed arrow 141, conical element 122 being carried therewith through frictional contact of a spring 142 attached to handle 124 and bearing against rim 128.

Rotation of the diaphragm enables rotational movement of apertures 132 and, accordingly, rotational movement of the images of apertures 132 across the wedges as above described. A brake 144 applies friction to rim 128, said friction exceeding the friction applied by spring 142. As a result, when handle 124 is manually rotated conical element 122 is caused to rotate and to move forwardly or rearwardly on threaded hub portions 118a while remaining components of the diaphragm are fixed against rotation by brake 144. Said forward or rearward movement of conical element 122 causes slides 130, which bear against the conical surface under bias of springs 134, to move radially. Accordingly, light apertures 132 are caused to move radially along underlying elongated plate apertures 126 and the images of apertures 132 are caused to move radially across the wedges as hereinbefore described. Limit stops 146 and 148 are provided to restrict the movement of handles 124 and 140, respectively, and thereby to limit traversal of the images to the area of the wedges.

A wide range of optical properties of the light-modifying elements above described is possible and permits various gradations of contrast in an image. The examples given are merely illustrative and are not intended as defining the full range of constructions which may be employed. Employing conventional terminology of phase microscopy, the representations of Figs. 4, 6, and 7, wherein both absorbing and retarding materials are included in the conjugate zone, may be considered as of a variable A plus or bright contrast type which are capable of producing an image of the particle in varying degrees of bright contrast with respect to the surround. For amplification of said terminology, reference may be had to A. H. Bennett et al., Transactions of the American Microscopical Society, vol. LXV, No. 2, April 1946. The illustration of Fig. 9 may be considered as of a variable A minus or dark contrast type where wedge 58 is composed of a metallic substance and layer 57 is formed of a dielectric substance, or of a variable B plus type where wedge 58 is composed of a dielectric substance and layer 57 is formed of a metallic substance. A variable A minus type may also be formed according to the construction of Fig. 10 where layer 113 is formed of a retarding material whose optical path equals or exceeds the maximum optical path of the dielectric wedge. Another variable B plus type may be formed consistent with the construction of Fig. 10, provided layer 113 is absorbing and has a transmission equal to or less than the minimum transmission of the absorbing wedge. A variable B minus contrast construction is represented by Fig. 11 assuming that one of the coatings 113 and 115 is light-absorbing and of a transmission equal to or less than the minimum transmission of the absorbing wedge, while the other or retarding coating has an optical path equal to or greater than that of the maximum optical path of the dielectric wedge. The A plus and A minus types may be combined in the example of Fig. 10 where layer 113 is retarding and has an optical path similar to that of an intermediate position on the retarding wedge. The B plus and B minus types may be combined in the representation of Fig. 11 where the absorbing coating on the complementary zone has a lower transmission than any part of the absorbing wedge and where the retarding coating has an optical path equal to an intermediate optical path of the retarding wedge.

In the examples given, it is generally assumed that the absorbing materials employed have negligible optical path and that the dielectric materials have insignificant absorbing properties. This condition can be realized sufficiently for practical purposes through the proper choice of materials. If, for example, an absorbing wedge is formed of a thin deposit of aluminum, its optical path may be considered as negligible.

The quantity, size and shape of light apertures and wedges may be varied as desired. There should be a sufficient number of apertures and wedges so oriented, that a substantially axially symmetrical configuration is formed. The size of the apertures should be small enough to insure that their images cover only a small portion of the wedges but large enough to furnish sufficient light. The shape of the apertures of the diaphragm are shown as round but may be of another shape as, for example, rectangular or in the form of sectors. Wedges and coatings may appropriately be formed through an evaporation in vacuum method. Any other satisfactory method may, however, be employed. Absorption properties of the elements, such as complementary portions of the disk, could, for example, be achieved by employing a glass or other material having absorption properties, thus avoiding the use of coatings. Limit stops have been shown for restricting movement of the images of the light rays to the areas of the wedges. If desired, however, it would readily be possible to reposition the stops which limit the rotational movement of the images (i. e., limit stops 148 of Fig. 12) so that the images of the diaphragm apertures would be moved beyond the wedges to other intervening conjugate portions of the plate. Assuming the last-named portions to be of a substantially nonmodifying material as, for example, a glass of constant thickness, the system would also be adapted to use as a conventional microscope or the like.

It will be apparent that other modifications of the devices and optical systems above described may be made in accordance with the general principles exemplified herein. Accordingly, such examples as have been generally presented are merely illustrative and the invention may be otherwise embodied and practiced within the scope of the following claims.

I claim:

1. An optical system for obtaining uninterrupted progressively variable contrast effects in the image of an illuminated object of the type producing deviated and undeviated light rays, said system comprising diaphragm means having a plurality of light apertures equally radially displaced from the optical axis of said system and providing a plurality of individual bundles of light rays of predetermined dimensions and contour adjacent an entrance pupil of said system and directed through said system, condenser and objective means coacting to provide a plurality of spaced images of said bundles of light rays at said entrance pupil at an image plane adjacent the exit pupil of said condenser and objective means and equally radially spaced from said optical axis, said objective transmitting light rays deviated by an object at an object plane optically aligned therewith and focusing said deviated light rays at a focal plane conjugate thereto, light-modifying means positioned adjacent said image plane comprising a transparent plate-like element having a plurality of radially positioned equally circumferentially spaced composite light transmitting wedges formed thereon for intercepting and modifying the phase and amplitude characteristics of the light rays of said bundles of rays which are undeviated by said object, each of said composite wedges including a radially tapering wedge component and a superposed wedge component which tapers in a direction substantially at 90° relative to the radially tapering component, means for rotating one of said diaphragm and light-modifying means to provide relative rotational movement of the images of said bundles of light rays at said entrance pupil and said wedges, and means for varying the radial position of said images with respect to said wedges, said movements providing gradual alteration of said phase and amplitude characteristics of the light rays transmitted by said wedges.

2. An optical system for obtaining uninterrupted progressively variable contrast effects in the image of an illuminated object of the type producing deviated and undeviated light rays, said system having diaphragm means comprising a plurality of circumferentially spaced radially and rotationally adjustable light apertures for providing a plurality of individual bundles of light rays of predetermined dimensions and contour adjacent an entrance pupil of said system and directed through said system, condenser and objective means coacting to provide a plurality of spaced images of said bundles of light rays at said entrance pupil at a plane adjacent the exit pupil of said condenser and objective means and equally radially spaced from said optical axis, said objective transmitting light rays deviated by an object at an object plane optically aligned therewith and focusing said deviated light rays at a focal plane conjugate thereto, light-modifying means positioned adjacent said image plane comprising a transparent plate-like element having a plurality of radially positioned equally circumferentially spaced, composite light transmitting wedges formed thereon for intercepting and modifying the phase and amplitude characteristics of said bundles of rays which are undeviated by said object, each of said composite wedges including a radially tapering wedge component and a superposed wedge component which tapers in a direction substantially at 90° relative to the radially tapering component, and means for gradually varying the radial and rotational position of said diaphragm apertures to vary the position of the images thereof with respect to said wedges and, accordingly, to vary the modification of said bundles of light rays transmitted by said wedges.

3. A diaphragm adapted to be positioned in a phase contrast type optical system comprising a principal rotatable disk having a plurality of equally circumferentially spaced, radially disposed perforations formed therein, a plurality of spring-biased, radially movable plates superposed upon portions of said disk adjacent and overlying said perforations, each plate having a light aperture of smaller dimensions than said perforations formed therein, means for simultaneously moving said plates radially to vary the radial position of said light apertures, and means for rotating said diaphragm to provide rotational movement of said light apertures independently of the radial movement of said plates.

4. A composite light-modifying device adapted to be positioned in a phase contrast type optical system, said device comprising a transparent disk, and a plurality of equally circumferentially spaced, radially disposed composite wedges formed thereon, each of said wedges being composed of a light-retarding wedge component tapering in a given direction for modifying the phase of a relatively small bundle of light rays when directed thereupon and a light-absorbing wedge component superposed relative to said light-retarding component and tapering in another given direction for modifying the amplitude of said bundle of light rays, said wedges each being comparatively small relative to the size of said transparent disk, the degree of modification of phase and amplitude performed by said wedges depending upon the portions thereof through which said light rays are transmitted.

5. A composite light-modifying device adapted to be positioned in a phase contrast type optical system, said device comprising a transparent disk, and a plurality of equally circumferentially spaced, radially disposed composite wedges formed thereon, said wedges being composed of a light-retarding wedge component each tapering in a given direction for modifying the phase of a relatively small bundle of light rays when directed thereupon and a light-absorbing wedge component superposed relative to the light-retarding component and each tapering in another given direction for modifying the amplitude of said bundle of light rays, other surface portions of said disk having a superposed layer of constant thickness formed of one of a light-absorbing material and a light-retarding material, said wedges each being comparatively small relative to the size of said transparent disk, the degree of modification of phase and amplitude performed by said wedges depending upon the portions thereof through which said light rays are transmitted and the modification performed by said layer of constant thickness being uniform throughout the area thereof.

6. An optical system for obtaining uninterrupted progressively variable contrast effects in the image of an illuminated object of a type capable of producing deviated and undeviated light rays, said system comprising diaphragm means having a plurality of light apertures equally radially displaced from the optical axis of said system and providing a plurality of individual bundles of light rays of predetermined dimensions and contour adjacent an entrance pupil of said system for transmission through said system, optically aligned condenser and objective means coacting to provide a plurality of images of said bundles of light rays at said entrance pupil at an image plane adjacent the exit pupil of said condenser and objective means and equally radially spaced from said optical axis, said objective means being at the same time so disposed relative to an object plane of said optical system as to transmit light rays from said bundles of light rays at said entrance pupil and deviated by an object at said object plane and focus said deviated rays at a focal plane conjugate thereto, light-modifying means positioned adjacent said image plane at said exit pupil and comprising a transparent plate-like element having a plurality of composite light transmitting wedges disposed thereon, each of said composite wedges being equally spaced from said optical axis and so spaced from each other as to individually intercept said bundles of rays at said exit pupil which are undeviated by said object and modify the phase and amplitude characteristics thereof, each of said composite wedges including a radially tapering first wedge component and a second wedge component which tapers in a direction substantially at 90° relative to said first tapering component, one of said components being formed of a dielectric material and the other component of a metallic material, means for moving one of said diaphragm means and light-modifying means in a given direction to provide a radial movement of the images of said bundles of light rays at said entrance pupil relative to said composite wedges, and means for rotatably moving one of said diaphragm means and said light-modifying means about said optical axis for moving said images across said composite wedges in a circumferential direction, said movements providing gradual alteration of said phase and amplitude characteristics of said bundles of light rays transmitted by said wedges toward said focal plane.

7. A phase contrast optical system for obtaining uninterrupted progressively variable contrast effects in an image of an object of low contrast and of the type producing deviated and undeviated light rays, said system comprising a condenser and objective means in predetermined spaced optically aligned relation along a common optical axis of said system, light control means providing a plurality of bundles of light rays of predetermined dimensions and contour adjacent an entrance pupil of said system, said bundles being equidistantly peripherally spaced from each other, and with said bundles each being spaced laterally a predetermined radial distance from said optical axis, said light control means directing said bundles of light rays along controlled paths toward said condenser in such a manner as to be transmitted thereby and directed toward an object plane of said objective means for illuminating an object at said object plane, said condenser and objective means coacting to provide an illumination image of each of said bundles of light rays at said entrance pupil at an image plane adjacent the exit pupil of said condenser and objective means combined with said images being formed in equally spaced peripheral relation to each other and equally spaced from said optical axis by the light rays which are undeviated by said object, said objective means being disposed adjacent said object plane so as to transmit and focus light rays which are deviated by said object as a contrast image at a conjugate focal plane of said objective means, supporting means positioned adjacent said exit pupil and having a plurality of transversely disposed thin light-transmitting wedges thereon positioned in equal peripherally spaced relation to each other and in equal radially spaced relation to said optical axis in such a manner as to intercept said undeviated light rays forming said illumination images without intercepting a material portion of said deviated light rays, each of said wedges comprising a pair of coatings of tapering thicknesses, one of said coatings being formed of a dielectric material and the other of a metallic material, one of said coatings tapering in a radial direction and the other in a direction at right angles thereto, said coatings being of such thicknesses and so tapered in their respective transverse directions that different light paths through different portions thereof will provide different optical values for appreciably and selectively modifying the phase and amplitude characteristics of said undeviated light rays traveling therethrough and toward said conjugate focal plane, said modication due to said thickness and taper being sufficient to provide a continuous range of contrast values between and including both positive and negative contrast, each of said wedges being of appreciably greater transverse area than the transverse area of the undeviated light rays forming one of said illumination images and intercepted thereby, and separately operable means for progressively varying, in an uninterrupted manner, the positional relation of said wedges in a circumferential direction about said optical axis and in a radial direction relative thereto and relative to said undeviated light rays impinging said wedges, to thereby cause said wedges to vary the effective optical path through the portion of each wedge being traversed by said undeviated light rays, said supporting means being formed of a light transmitting material for allowing said deviated and undeviated light rays passing beyond said exit pupil to travel in overlapping relation toward said conjugate focal plane, whereby progressively variable positive and negative contrast effects in said contrast image of said object at said conjugate focal plane may be obtained.

8. A phase contrast optical system for obtaining uninterrupted progressively variable contrast effects in an image of an object of low contrast and of the type producing deviated and undeviated light rays, said system comprising a condenser and objective means in predetermined spaced optically aligned relation along a common optical axis of said system, light control means providing a plurality of bundles of light rays each of predetermined dimensions and contour adjacent an entrance pupil of said system and each equally spaced radially from said optical axis, said light control means directing said bundles of light rays along controlled paths toward said condenser in such a manner as to be transmitted thereby and directed toward an object plane of said objective means for illuminating an object at said object plane, said condenser and objective means coacting to provide a plurality of illumination images of said bundles of light rays at said entrance pupil at an image plane adjacent the exit pupil of said condenser and objective means combined with said plurality of images being formed by a plurality of bundles of light rays which are undeviated by said object being equally spaced radially from said optical axis, said objective means being disposed adjacent said object plane so as to transmit and focus light rays which are deviated by said object as a contrast image at a conjugate focal plane of said objective means, supporting means positioned adjacent said exit pupil and having a plurality of composite wedge means thereon and equally spaced from said optical axis, each composite wedge means comprising two light-transmitting wedges positioned in such a manner as to successively intercept said undeviated light rays forming said illumination images without intercepting a material portion of said deviated light rays, said two wedges of each composite wedge means being tapered in different transverse directions, one of said wedges of each wedge means being tapered radially and the other tapered circumferentially, respectively, one of said wedges of each wedge means being formed of a dielectric material which will appreciably modify the phase characteristics and the other of said wedges being formed of metallic material which will appreciably modify the amplitude characteristics of said undeviated light rays traveling therethrough and toward said conjugate focal plane, the taper of said wedges being sufficient to provide a continuous range of contrast values between and including both positive and negative contrast, said wedges each being of appreciably greater transverse dimensions in said two different directions of taper respectively than the like transverse dimension of the undeviated light rays forming said illumination images and intercepted thereby, and means for selectively and separately progressively radially and circumferentially varying, in an uninterrupted manner, the transverse positional relations of said plurality of wedges relative to said plurality of undeviated light rays impinging thereon, to thereby cause said wedges to vary the effective optical path through the portions of the wedges being traversed by said plurality of bundles of undeviated light rays, said supporting means being formed of a light transmitting material for allowing said deviated and undeviated light rays passing beyond said exit pupil to travel in overlapping relation toward said conjugate focal plane, whereby progressively variable positive and negative contrast effects in said contrast image of said object at said conjugate focal plane may be obtained.

9. A phase contrast optical system for obtaining uninterrupted progressively variable contrast effects in an image of an object of low contrast and of the type producing deviated and undeviated light rays, said system comprising a condenser and objective means in predetermined spaced optically aligned relation along a common optical axis of said system, light control means providing a plurality of bundles of light rays of predetermined dimensions and contour adjacent an entrance pupil of said system, said bundles being equidistantly peripherally spaced relative to each other, and said bundles each being spaced laterally a predetermined radial distance from said optical axis, said light control means directing said bundles of light rays along controlled paths toward said condenser in such a manner as to be transmitted thereby and directed toward an object plane of said objective means for illuminating an object at said object plane, said light control means comprising an opaque disk having a plurality of equally circumferentially spaced openings therein, a plurality of radially movable opaque plates overlying said openings and having relatively small light apertures similarly formed therein, and actuating means for simultaneously moving said plates radially, said condenser and objective means coacting to provide an illumination image of each of said bundles of light rays at said entrance pupil at an image plane adjacent the exit pupil of said condenser and objective means combined with said images being formed in symmetrically spaced relation to each other and equally spaced from said optical axis by the light rays which are undeviated by said object, said objective means being disposed adjacent said object plane so as to transmit and focus light rays which are deviated by said object as a contrast image at a conjugate focal plane of said objective means, a supporting disk positioned adjacent said exit pupil and having a plurality of light-transmitting composite wedges thereon positioned in equally peripherally spaced relation to each other and in equally radially spaced and similarly arranged relation to said optical axis in such a manner as to intercept said undeviated light rays forming said illumination images without intercepting a material portion of said deviated light rays, each of said composite wedges comprising a dielectric wedge component and a metallic wedge component differently angularly directed relative to each other and with one component wedge tapered radially and the other circumferentially, each of said composite wedges being of such a thickness and so tapered in predetermined transverse directions and like manner relative to said optical axis that different light paths through different portions of each composite wedge will similarly provide different optical values appreciably modifying the phase and amplitude characteristics of said undeviated light rays traveling therethrough and toward said conjugate focal plane, said modification due to said thickness and taper being sufficient to provide a continuous range of contrast values between and including both positive and negative contrast, each of said composite wedges being of appreciably greater transverse area than the transverse area of the undeviated light rays forming the illumination image intercepted thereby, and manual means for rotating one of said disks relative to the other of said disks and for changing the radial positions of said movable opaque plates for independently, selectively and progressively varying, in an uninterrupted manner, the radial positional relation as well as the circumferential positional relation of each of said composite wedges relative to each illumination image of undeviated light rays impinging thereon, to cause said composite wedges to thereby vary the effective optical paths through the portions of each wedge being traversed by said undeviated light rays, said supporting disk being formed of light transmitting material for allowing said deviated and undeviated light rays passing beyond said exit pupil to travel in overlapping relation toward said conjugate focal plane, whereby progressively variable positive and negative contrast effects in said contrast image of said object at said conjugate focal plane may be obtained.

References Cited in the file of this patent

UNITED STATES PATENTS

| | | |
|---|---|---|
| 750,237 | Bausch et al. | Jan. 19, 1904 |
| 1,368,608 | Curren | Feb. 15, 1921 |
| 1,805,969 | Bostrom | May 19, 1931 |
| 2,195,166 | Diggins | Mar. 26, 1940 |
| 2,206,169 | Eisenhut et al. | July 2, 1940 |
| 2,331,027 | Harrison | Oct. 5, 1943 |
| 2,418,602 | Richards | Apr. 8, 1947 |
| 2,427,689 | Osterberg et al. | Sept. 23, 1947 |
| 2,516,905 | Osterberg et al. | Aug. 1, 1950 |
| 2,637,243 | Marx | May 5, 1953 |
| 2,675,737 | Bennett | Apr. 20, 1954 |

FOREIGN PATENTS

| | | |
|---|---|---|
| 15,678 | Great Britain | of 1912 |
| 4,914 | Great Britain | of 1907 |
| 636,168 | Germany | Oct. 7, 1936 |